(12) United States Patent
Ng et al.

(10) Patent No.: US 11,636,478 B2
(45) Date of Patent: Apr. 25, 2023

(54) METHOD OF PERFORMING AUTHENTICATION FOR A TRANSACTION AND A SYSTEM THEREOF

(71) Applicant: NANYANG TECHNOLOGICAL UNIVERSITY, Singapore (SG)

(72) Inventors: Wee Keong Ng, Singapore (SG); Supun Tharaka Mawanane Hewa, Singapore (SG); Hoang Giang Do, Singapore (SG); Thanh Nghia Ho, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 360 days.

(21) Appl. No.: 16/633,725

(22) PCT Filed: Jul. 27, 2018

(86) PCT No.: PCT/SG2018/050383
§ 371 (c)(1),
(2) Date: Jan. 24, 2020

(87) PCT Pub. No.: WO2019/022674
PCT Pub. Date: Jan. 31, 2019

(65) Prior Publication Data
US 2020/0211004 A1  Jul. 2, 2020

(30) Foreign Application Priority Data

Jul. 27, 2017 (SG) .......................... 10201706142R

(51) Int. Cl.
*G06Q 20/40* (2012.01)
*G06Q 20/38* (2012.01)
(Continued)

(52) U.S. Cl.
CPC ......... *G06Q 20/401* (2013.01); *G06Q 20/385* (2013.01); *G06Q 20/3829* (2013.01);
(Continued)

(58) Field of Classification Search
None
See application file for complete search history.

(56) References Cited

U.S. PATENT DOCUMENTS 6,959,089 B1 * 10/2005 Sprunk ................ G11B 31/006
380/239
2007/0016788 A1 * 1/2007 Kakehi ................ H04L 9/3247
713/176
(Continued)

FOREIGN PATENT DOCUMENTS

CN 105871920 A * 8/2016
CN 105871920 A   8/2016
(Continued)

OTHER PUBLICATIONS

Aloni, F et al., *Two Factor Authentication Using Mobile Phones*, IEEE/ACS International Conference on Computer Systems and Applications, AICCSA (2009) 641-644.
(Continued)

*Primary Examiner* — Neha Patel
*Assistant Examiner* — Jahed Ali
(74) *Attorney, Agent, or Firm* — Alston & Bird LLP

(57) ABSTRACT

There is provided a method of performing authentication for a transaction between first and second devices. The method includes: generating a first random number and encrypting it based on a first key of a first private-public key pair; sending the encrypted first random number to the server; receiving a transaction identifier for the transaction, the first random number and a second random number, wherein the transaction identifier, the first random number and the second
(Continued)

random number are encrypted based on a first key of a second private-public key pair; decrypting the encrypted transaction identifier, the encrypted first random number and the encrypted second random number based on a second key of the second private-public key pair; and sending the transaction identifier, and the second random number to the second device for authenticating the first device for the transaction. There is also provided a corresponding device and system.

17 Claims, 6 Drawing Sheets

(51) Int. Cl.
  H04L 9/08 (2006.01)
  H04L 9/14 (2006.01)
  H04L 9/30 (2006.01)
  H04L 9/32 (2006.01)
(52) U.S. Cl.
  CPC ............ *H04L 9/0869* (2013.01); *H04L 9/14* (2013.01); *H04L 9/3073* (2013.01); *H04L 9/3247* (2013.01); *H04L 9/3273* (2013.01); *G06Q 2220/00* (2013.01)

(56) References Cited

U.S. PATENT DOCUMENTS

| | | | | |
|---|---|---|---|---|
| 2007/0050622 | A1* | 3/2007 | Rager | H04L 9/3271 713/168 |
| 2007/0113073 | A1* | 5/2007 | Maillard | H04N 5/913 380/255 |
| 2010/0205448 | A1* | 8/2010 | Tarhan | G06F 21/33 713/185 |
| 2012/0185398 | A1* | 7/2012 | Weis | G06Q 20/401 705/75 |
| 2012/0288092 | A1* | 11/2012 | Cakulev | H04L 63/30 380/255 |
| 2013/0110607 | A1* | 5/2013 | Basmajian | G06Q 30/0238 705/14.26 |
| 2013/0262858 | A1* | 10/2013 | Neuman | G06Q 20/322 713/155 |
| 2015/0310436 | A1* | 10/2015 | Lakshmanan | G06Q 20/40 705/44 |
| 2015/0379510 | A1* | 12/2015 | Smith | G06Q 20/3829 705/71 |
| 2018/0068305 | A1* | 3/2018 | Baik | G06Q 20/385 |
| 2018/0192460 | A1* | 7/2018 | Huh | H04W 88/04 |
| 2019/0272365 | A1* | 9/2019 | Huh | G06F 21/34 |
| 2019/0394053 | A1* | 12/2019 | Yu | H04L 63/0823 |
| 2020/0008057 | A1* | 1/2020 | Zhao | H04W 12/50 |
| 2020/0058022 | A1* | 2/2020 | Ma | H04L 9/008 |
| 2020/0092269 | A1* | 3/2020 | Le Saint | G06Q 20/3227 |
| 2020/0136824 | A1* | 4/2020 | Allen | G06Q 30/0601 |
| 2020/0211004 | A1* | 7/2020 | Ng | G06Q 20/4097 |
| 2020/0257496 | A1* | 8/2020 | Lee | G10L 15/30 |
| 2021/0099526 | A1* | 4/2021 | Lee | H04L 67/143 |

FOREIGN PATENT DOCUMENTS

| | | | |
|---|---|---|---|
| CN | 106327184 A | 1/2017 | |
| CN | 106656489 A | 5/2017 | |
| KR | 101721173 B1 | 3/2017 | |
| WO | WO-2004019553 A1 * | 3/2004 | ........... H04L 63/067 |

OTHER PUBLICATIONS

Bellare, M. et al., *Optimal Asymmetric Encryption—How to Encrypt With RSA*, Eurocrypt (1994) 19 pages.

McCune, J. M. et al., *Seeing-Is-Believing: Using Camera Phones for Human-Verifiable Authentication*, IEEE Symposium on Security and Privacy (2005) 23 pages.

Rivest, R. L. et al., *A Method for Obtaining Digital Signatures and Public-Key Cryptosystems*, Communications of the ACM, vol. 21, No. 2 (1978) 120-126, 16 pages.

International Search Report and Written Opinion for Application No. PCT/SG2018/050383 dated Oct. 22, 2018, 10 pages.

* cited by examiner

METHOD OF PERFORMING AUTHENTICATION FOR A TRANSACTION AND A SYSTEM THEREOF

CROSS-REFERENCE TO RELATED APPLICATIONS

This application is a national phase entry of International Application No. PCT/SG2018/050383, filed Jul. 27, 2018, which claims to Singapore Patent Application No. 10201706142R, filed 27 Jul. 2017, the entire contents of which are incorporated herein by reference.

TECHNICAL FIELD

The present invention generally relates to a method of performing authentication for a transaction and a system thereof, and more particularly, for a transaction between a first device and a second device.

BACKGROUND

Authentication methods and systems are a vital component in nearly all aspects of the Internet connected world. For example, in the cyber world (or cyberspace), trust is always a huge problem and authentication methods/systems provide a prominent answer for it. For example, consider two internet connected devices that wish to perform a certain transaction, a first and necessary step is often authentication before the transaction may proceed.

Conventional authentication techniques typically rely on static passwords to verify a user's identity to a system. However, such conventional password-based authentication techniques may be error-prone and tedious in terms of user experience. For example, conventional password-based authentications may not be appropriate or sufficiently secure for various electronic services that require strong security, such as electronic payments. As an example relating to card payment systems, the owner of a card is normally required to remember the PIN (Personal Identification Number) associated with the card in order to perform a transaction using the card. However, since the PIN and the card number often remain the same over a long period of time (e.g., months or years), they are susceptible to information theft. For example, there have been numerous cases of sensitive information leakage, including payment card numbers (e.g., credit card numbers) and passwords, which may result in a huge loss for the users and/or organizations.

A need therefore exists to provide a method of performing authentication for a transaction and a system thereof that seek to overcome, or at least ameliorate, one or more of the deficiencies in conventional authentication methods and systems, such as but not limited to, improving security as well as enhancing user friendliness. It is against this background that the present invention has been developed.

SUMMARY

According to a first aspect of the present invention, there is provided a computer-implemented method of performing authentication for a transaction between a first device and a second device, the method comprising:
  generating, at the first device, a first random number and encrypting the first random number based on a first key of a first private-public key pair;
  sending, by the first device, the encrypted first random number to the server;
  receiving, at the first device, a transaction identifier for the transaction, the first random number and a second random number from the server, wherein the transaction identifier, the first random number and the second random number are encrypted based on a first key of a second private-public key pair;
  decrypting, at the first device, the encrypted transaction identifier, the encrypted first random number and the encrypted second random number received based on a second key of the second private-public key pair;
  verifying, at the first device, the first random number decrypted; and
  sending, by the first device, the transaction identifier, and the second random number to the second device via a communication channel between the first and second devices for authenticating the first device for the transaction based on the second random number.

According to a second aspect of the present invention, there is provided a system comprising:
  a server;
  a first device capable of communicating with the server; and
  a second device capable of communicating with the server,
wherein:
  the first device comprises:
  a memory; and
  at least one processor communicatively coupled to the memory and configured to:
    generate a first random number and encrypting the first random number based on a first key of a first private-public key pair;
    send the encrypted first random number to the server;
    receive a transaction identifier for the transaction, the first random number and a second random number from the server, wherein the transaction identifier, the first random number and the second random number are encrypted based on a first key of a second private-public key pair;
    decrypt the encrypted transaction identifier, the encrypted first random number and the encrypted second random number received based on a second key of the second private-public key pair;
    verify the first random number decrypted; and
    send the transaction identifier, and the second random number to the second device via a communication channel between the first and second devices for authenticating the first device for the transaction based on the second random number.

According to a third aspect of the present invention, there is provided a device comprising:
  a memory; and
  at least one processor communicatively coupled to the memory and configured to:
    generate a first random number and encrypting the first random number based on a first key of a first private-public key pair;
    send the encrypted first random number to the server;
    receive a transaction identifier for a transaction between the device and another device, the first random number and a second random number from the server, wherein the transaction identifier, the first random number and the second random number are encrypted based on a first key of a second private-public key pair;
    decrypt the encrypted transaction identifier, the encrypted first random number and the encrypted second random number received based on a second key of the second private-public key pair;

verify the first random number decrypted; and send the transaction identifier and the second random number to said another device via a communication channel between the device and said another device for authenticating the device for the transaction based on the second random number.

According to a fourth aspect of the present invention, there is provided a computer program product, embodied in one or more non-transitory computer-readable storage mediums, comprising instructions executable by at least one processor to perform a method of performing authentication for a transaction between a first device and a second device, the method comprising:

generating, at the first device, a first random number and encrypting the first random number based on a first key of a first private-public key pair;

sending, by the first device, the encrypted first random number to the server;

receiving, at the first device, a transaction identifier for the transaction, the first random number and a second random number from the server, wherein the transaction identifier, the first random number and the second random number are encrypted based on a first key of a second private-public key pair;

decrypting, at the first device, the encrypted transaction identifier, the encrypted first random number and the encrypted second random number received based on a second key of the second private-public key pair; and verifying, at the first device, the first random number decrypted; and sending, by the first device, the transaction identifier and the second random number to the second device via a communication channel between the first and second devices for authenticating the first device for the transaction based on the second random number.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Figure 1:
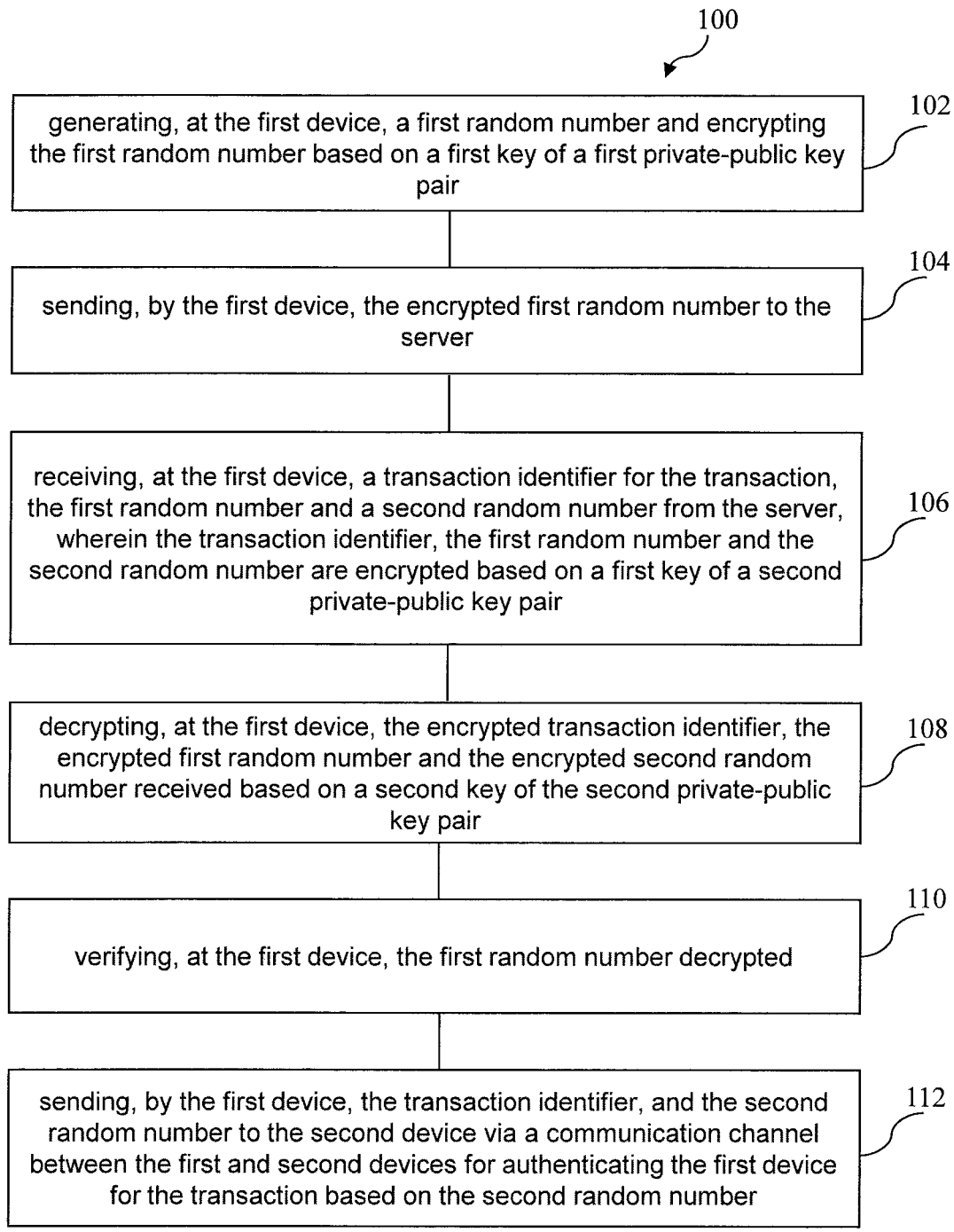
FIG. 1 depicts a schematic flow diagram of a method of performing authentication for a transaction between a first device and a second device.

Various embodiments of the present invention provide a method (computer-implemented method) of performing authentication for a transaction and a system thereof, and more particularly, for a transaction between a first device and a second device. It can be understood by a person skilled in the art that the first device and/or the second device may be any computing or electronic device comprising a memory and a processor communicatively coupled to the memory and configured to perform authentication for a transaction as described herein according to various embodiments of the present invention, such as but not limited to, mobile communications devices (e.g., smart phones), wearable devices (e.g., smart watches), tablet computers, internet of things (IoT) devices, desktop or portable laptop computers, and so on. For example, the first device and/or the second device may be any computing or electronic device capable of receiving data, processing the data received or the data stored therein based on one or more functional modules (e.g., software programs) as described herein according to various embodiments, and transmitting the processed data.

In various embodiments, the first device and/or the second device is configured to be able to communicate with one or more servers (data servers) via a communication interface based on any one or more wired or wireless communication protocols known in the art (e.g., capable of being connected to the Internet), such as but not limited to, cellular network (e.g., 3G, 4G, or higher generation wireless mobile telecommunications technology), Wi-Fi network, Bluetooth, and so on. Accordingly, the first device and/or the second device may operate as respective node(s) in a network environment and communicate with one or more servers and other device(s) or node(s) in the network environment. It will also be appreciated by a person skilled in the art that the first and second devices may be any two devices instructed to perform a transaction therebetween amongst a plurality of devices.

It can be understood by a person skilled in the art that the server may be any computer device or system capable of receiving data, processing the data received or the data stored therein based on one or more functional modules (e.g., software programs) as described herein according to various embodiments, and transmitting the processed data. For example, the server may also be referred to as a computer server, a storage server, a cloud server, and so on, and depending on the specific application, the server may also be referred to as a payment server for a payment application for example. It will also be appreciated by a person skilled in the art that a server may be realized by or implemented as one unit or a plurality of units (e.g., located at one location or at different locations), as long as the one unit or the plurality of units are configured to process the data received or data stored therein based on the one or more functional modules as described herein according to various embodiments.

In general, authentication is the use of one or more mechanisms to prove that you are who you claim to be. Typically, once the identity of a user (e.g., a user's device) is validated, access is granted to the user. Accordingly, an authentication method may be applied to any type of transaction whereby it is either necessary or desirable to verify or validate the identity of a user (e.g., a user's device). For example, a common type of transaction in need of authentication is an electronic payment transaction. However, it will be appreciated to a person skilled in the art that the present invention is not limited to an electronic payment transaction (e.g., does not necessarily involve transfer of funds), and may be applied to authenticate one or more devices desiring to perform any type of transaction therebetween for various purposes, such as but not limited to, data transfer transaction (e.g., peer-to-peer file transfer, which may include sensitive or personal information), delivery confirmation transaction, and so on.

FIG. 1 depicts a schematic flow diagram of a method 100 (computer-implemented method) of performing authentication for a transaction between a first device and a second device. The method 100 includes, at 102, generating, at the first device, a first random number and encrypting the first random number based on a first key (e.g., a public key) of a first private-public key pair (e.g., generated for or in relation to a server, which may also be referred to as the server's private-public key pair); at 104, sending, by the first device, the encrypted first random number to the server; at 106, receiving, at the first device, a transaction identifier for the transaction, the first random number and a second random number from the server, wherein the transaction identifier, the first random number and the second random number are encrypted based on a first key (e.g., a public key) of a second private-public key pair (e.g., generated for or in relation to the first device, which may also be referred to as the first device's private-public key pair); at 108, decrypting, at the first device, the encrypted transaction identifier, the encrypted first random number and the encrypted second random number received based on a second key (e.g., a private key) of the second private-public key pair; at 110, verifying, at the first device, the first random number decrypted; and at 112, sending, by the first device, the transaction identifier, and the second random number to the second device via a communication channel between the first and second devices for authenticating the first device for the transaction based on the second random number.

For example, the first key of the first private-public key pair for encrypting the first random number may be the public key of the private-public key pair generated for the server (or simply referred to as the server's public key). Correspondingly, it will be appreciated by a person skilled in the art that the first key of the first private-public key pair for encrypting the first random number may instead be the secret key of the private-public key pair generated for the first device (or simply referred to as the first device's secret key), since the server possesses the first device's public key, and thus would also be able to decrypt the first random number encrypted by the first device's secret key. It will be appreciated to a person skilled in the art that this similarly applies to other private-public key pairs and to the encryption/decryption of other data disclosed herein, and thus need not be explained again throughout the description for conciseness.

In various embodiments, in relation to 102 and 104, for example, the first device may be configured to initiate a transaction process or an authentication process by generating the first random number (e.g., a random nonce or integer number) and encrypt the first random number using the server's public key (e.g., the server's public key may be pre-stored in the first device), and then send a message or request (e.g., initialization message or request) to the server together with the encrypted first random number.

In various first embodiments, in relation to 106, for example, in response to receiving the initialization request, the server may be configured to generate a transaction identifier (e.g., random transaction number) for the transaction desired to be performed between the first and second devices. The server may then send a message comprising the transaction identifier and the first random number (after decrypting the encrypted first random number received from the first device) to the first device, together with a digital signature of the message generated based on the server's private key. In this regard, the message may be encrypted by the server based on the first device's public key (e.g., the first device's public key may be pre-stored in the server). Accordingly, at 106, for example, in response to sending the initialization request (or the first encrypted first random number) to the server, the first device may receive the message comprising the transaction identifier and the first random number, and the digital signature of the message.

In various second embodiments, in relation to 106, for example, in response to receiving the initialization request, the server may be configured to generate a transaction identifier (e.g., random transaction number) for the transaction desired to be performed between the first and second devices and a second random number. The server may then send a message comprising the transaction identifier, the first random number (after decrypting the encrypted first random number received from the first device) and the second random number to the first device, together with a digital signature of the message generated based on the server's private key. In this regard, the message may be encrypted by the server based on the first device's public key (e.g., the first device's public key may be pre-stored in the server). Accordingly, at 106, for example, in response to sending the initialization request (or the first encrypted first random number) to the server, the first device may receive the message comprising the transaction identifier, the first random number and the second random number, and the digital signature of the message.

Accordingly, in relation to 106, receiving, at the first device, a transaction identifier for the transaction, the first random number and a second random number from the server may include receiving a message comprising the transaction identifier and the first random number, and then subsequently receiving the second random number according to various first embodiments, or may include receiving a message comprising the transaction identifier, the first random number and the second random number according to various second embodiments. That is, at 106, in various embodiments, it is not necessary for each of the transaction identifier, the first random number and the second random number to be received at the same time or stage, and may be received at different times or stages of the authentication process.

In various embodiment, in relation to 108, the encrypted transaction identifier, the encrypted first random number and the encrypted second random number received from the server may be decrypted based on the first device's private key. For example, similar to the above-described various embodiments in relation to 106, it is not necessary for each of the encrypted transaction identifier, the encrypted first random number and the encrypted second random number to be decrypted at the same time. For example, in various first embodiments whereby an encrypted message comprising the transaction identifier and the first random number is received, and then the encrypted second random number is subsequently received, the encrypted message may be decrypted before the encrypted second random number. On the other hand, in various second embodiments, if an encrypted message comprising the transaction identifier, the first random number and the second random number is received at the same time or stage, the encrypted message may thus be decrypted to output the transaction identifier, the first random number and the second random at the same time or stage.

In various embodiment, in relation to 110, the first random number decrypted may be compared with the original or initial first random number generated by the first device. In this regard, if the decrypted first random number matches the initial first random number, then the verification in relation to the first random number is deemed successful, otherwise (i.e., if they do not match), the verification in relation to the first random number is deemed unsuccessful. If the verification is successful, the authentication method may continue, otherwise, the authentication method for the transaction may be terminated and the authentication may be deemed unsuccessful.

In various embodiments, in relation to 112, the transaction identifier and the second random number may be sent directly from the first device to the second device via the communication channel (e.g., direct communication channel) between the first and second devices. For example, upon receiving the second random number from the first device, the second device may then send the second random number to the server for authenticating the first device for the transaction based on the second random number. For example, according to various first embodiments, the server may generate the second random number as being associated with the first device for the transaction. Accordingly, the server is able to authenticate the first device to the second device based on the second random number received from the second device by comparing the second random number received and the original or initial second random number generated by the server (e.g., the initial second random number generated by the server is also stored at the server). In this regard, if the second random number matches the initial second random number, then the authentication of the first device for the transaction may be deemed successful, otherwise (i.e., if they do not match), the authentication of the first device may be deemed unsuccessful.

Accordingly, various embodiments of the present invention advantageously provide a method (computer-implemented method) of performing authentication for a transaction that improves security as well as enhancing user friendliness. For example, in various embodiments, the authentication method is performed based on the verification of the above-mentioned first random number between the server and the first device, which for example is helpful to defend against man-in-the-middle (MITM) attacks on the communication link between the server and the first device. In addition, the authentication method is further performed based on the verification of the above-mentioned second random number between the server and the second device for further verifying the identity of the first device, which for example is helpful to defend against replay attacks. In various embodiments, the authentication method is further strengthened by utilizing public key cryptography challenged responses in various steps thereof, which for example is helpful to secure against impersonation attack. In addition, as the authentication method according to various embodiments does not require the user/owner of the first device and/or the second device to remember any password such as a PIN, the authentication method is advantageously more user friendly than various conventional authentication methods, such as the conventional password-based authentication methods as discussed in the background.

In various first embodiments, in relation to 106, the mentioned receiving comprises receiving a message comprising the transaction identifier and the first random number, and a digital signature of the message generated based on a second key (e.g., a private key) of the first private-public key pair (e.g., the server's private key), whereby the message is encrypted based on the first key of the second private-public key pair (e.g., the first device's public key). Furthermore, in relation to 110, the mentioned verifying further comprises verifying, at the first device, the digital signature of the message received based on the first key of the first private-public key pair (e.g., the server's public key).

In various first embodiments, the method 100 may further comprise receiving, at the first device, a third random number associated with the second device (e.g., generated by the server for the second device, which may also be referred to as the second device's random number) from the second device via the communication channel; and sending, by the first device, the third random number to the server for authenticating the second device for the transaction based on the third random number. In this regard, the transaction identifier and the second random number may be sent directly from the second device to the first device via the communication channel (e.g., direct communication channel) between the first and second devices. For example, upon receiving the third random number (associated with the second device) from the second device, the first device may then send the third random number to the server for authenticating the second device for the transaction based on the third random number. In this regard, for example, the server generates the third random number as being associated with the second device for the transaction. Accordingly, the server is able to authenticate the second device to the first device based on the third random number received from the first device by comparing the third random number received and the original or initial third random number generated by the server (e.g., the initial third random number generated by the server is also stored in the server). In this regard, if the third random number matches the initial third random number, then the authentication of the second device for the transaction may be deemed successful, otherwise (i.e., if they do not match), the authentication of the second device may be deemed unsuccessful.

In various first embodiments, the sending of the second random number associated with the first device from the first device to the second device and the sending of the third random number associated with the second device from the second device to the first device may be considered or referred to as the first and second device exchanging the second and third random numbers for authentication purpose.

In various first embodiments, the method 100 further comprises sending, by the first device, a digital signature of the third random number generated based on the second key of the second private-public key pair (e.g., the first device's private key) to the server for authenticating the second device for the transaction further based on the digital signature of the third random number.

Similarly, in various first embodiments, the method 100 further comprises sending, by the second device, a digital signature of the second random number generated based on a second key of the third private-public key pair (e.g., the second device's private key) to the server for authenticating the first device for the transaction further based on the digital signature of the second random number.

In various first embodiments, for example from the perspective of the second device, the method further comprises: receiving, at the second device, a first identifier associated with the first device from the first device; sending, by the second device, the transaction identifier and the first identifier to the server; receiving, at the second device, the third random number associated with the second device from the server, whereby the third random number is encrypted based on a first key (e.g., a public key) of a third private-public key pair (e.g., generated for or in relation to the second device); and sending, by the second device, the second random number received from the first device to the server for authenticating the first device for the transaction based on the second random number. In this regard, the second random number may be generated by the server for or so as to be associated with the first device. For example, the first identifier may be a digital or electronic identity associated with the first device and/or the user, such as but not limited to, IMEI (International Mobile Equipment Identity) number associated with the device, IMSI (International Mobile Subscriber Identity) number associated with the device, phone number, email address and/or username, and so on.

In various first embodiments, for example from the perspective of the server, the method 100 further comprises: receiving, at the server, the transaction identifier and the first identifier from the second device; generating, at the server, the second random number associated with the first device and the third random number associated with the second device; encrypting, at the server, the second random number and the third random number based on the first key (e.g., the public key) of the second private-public key pair and the first key (e.g., the public key) of the third private-public key pair, respectively; sending, at the server, the encrypted second random number and the encrypted third random number to the first device and the second device, respectively; and receiving, at the server, the second random number and the third random number from the second device and the first device, respectively, for authenticating the first device and the second device for the transaction based on the second random number and the third random number.

In various first embodiments, the second device may send a second identifier associated with the second device to the server (e.g., the second device may implicitly send the second identifier to the server when the second device sends a message to the server), and the first device may also have initially sent the first identifier associated with the first device to the server (e.g., the first device may implicitly send the first identifier to the server when the first device sends a message to the server, such as the initialization request). For example, upon receiving the initialization request for a transaction from the first device, an individual transaction dataset (e.g., transaction entry or record) may be created at the server for that transaction for storing and/or handling various data (e.g., metadata) associated with the transaction. For example, upon receiving the initialization request, the transaction dataset created for the transaction may include the transaction identifier and the first identifier associated with the first device as a party to the transaction (e.g., payee of the transaction). Similar to the first identifier, the second identifier may be a digital or electronic identity associated with the first device and/or the user, such as but not limited to, IMEI number associated with the device, IMSI number associated with the device, phone number, email address and/or username, and so on.

In various first embodiments, the server may receive the second identifier from the second device, along with the transaction identifier and the first identifier. As a result, the server may be configured to recognize that the second device is another party to the transaction (e.g., payer of the transaction) and add the second identifier to the transaction dataset created for the transaction. Thereafter, in various first embodiments, the server may then be configured to generate the second random number associated with (or for) the first device and the third random number associated with (or for) the second device for the first and second devices to exchange therebetween for authentication purpose as described herein according to various first embodiments. In this regard, the server may also be configured to add the second and third random numbers generated to the transaction dataset for the transaction such that the third and second random numbers received from the first and second devices, respectively, after the above-mentioned exchange therebetween can be compared with the original or initial second and third random numbers generated for the first and second devices, respectively, for authentication purpose as described herein according to various first embodiments.

In various first embodiments, the communication channel in which the first and second devices communicate data with each other is based on a two-way (bidirectional) wireless communication channel. In other words, the first and second device are able to communicate directly with each other via the two-way wireless communication channel, such as but not limited to, near-field communication (NFC), Wi-Fi Direct communication, Bluetooth wireless communication, and so on. For example, the two-way wireless communication channel enables the exchange of the second and third random numbers directly between the first and second devices for authentication purpose as described herein according to various first embodiments of the present invention.

In various second embodiments, in relation to 106, the mentioned receiving comprises receiving a message comprising the transaction identifier, the first random number and the second random number, and a digital signature of the message generated based on a second key of the first private-public key pair (e.g., the server's private key), whereby the message is encrypted based on the first key of the second private-public key pair (e.g., the first device's public key); and in relation to 110, the mentioned verifying further comprises verifying, at the first device, the digital signature of the message received based on the first key of the first private-public key pair (e.g., the server's public key).

In various second embodiments, for example from the perspective of the second device, the method 100 further comprises sending, by the second device, the transaction identifier and the second random number to the server for authenticating the first device for the transaction based on the second random number.

In various second embodiments, the second device may also send a second identifier associated with the second device to the server (e.g., the second device may implicitly send the second identifier to the server when the second device sends a message to the server), and the first device may also have initially sent the first identifier associated with the first device to the server (e.g., the first device may implicitly send the first identifier to the server when the first device sends a message to the server, such as the initialization request). For example, upon receiving the initialization request for a transaction from the first device, an individual transaction dataset (e.g., transaction entry or record) may be created at the server for that transaction for storing and/or handling various data (e.g., metadata) associated with the transaction. For example, upon receiving the initialization request, the transaction dataset created for the transaction may include the transaction identifier, the first identifier associated with the first device as a party to the transaction (e.g., payee of the transaction) and the second random number.

In various second embodiments, the server may receive the second identifier from the second device, along with the transaction identifier, the first identifier and the second random number. As a result, the server may be configured to recognize that the second device is another party to the transaction (e.g., payer of the transaction) and add the second identifier to the transaction dataset created for the transaction. Thereafter, in various second embodiments, the server may then be configured to authenticate the first device to the second device based on the second random number received from the second device by comparing the second random number received and the original or initial second random number stored in the transaction dataset associated with the transaction. In this regard, if the second random number matches the initial second random number, then the authentication of the first device for the transaction may be deemed successful, otherwise (i.e., if they do not match), the authentication of the first device may be deemed unsuccessful.

In various second embodiments, the communication channel in which the first device communicates data to the second device is based on a one-way visual communication channel, such as but not limited to, the display of an image by a device (e.g., the first device) and the capture of the image by another device (e.g., the second device), the image being a graphical representation of the data, for example, data encoded as a one-dimensional barcode or a two-dimensional barcode (e.g., QR code), as known in the art. Accordingly, the visual communication channel may be a one-way communication channel from the first device to the second device. For example, the second device receiving the data from the first device may further comprise an image capturing module (e.g., camera) capable of capturing an image (e.g., a QR code). The image may then be processed by a processor therein for decoding the image into corresponding data. For example, the first device sending the data may further comprise a display capable of displaying an image representing the data desired to be transmitted to the second device, which is to be captured by the second device.

Figure 2:
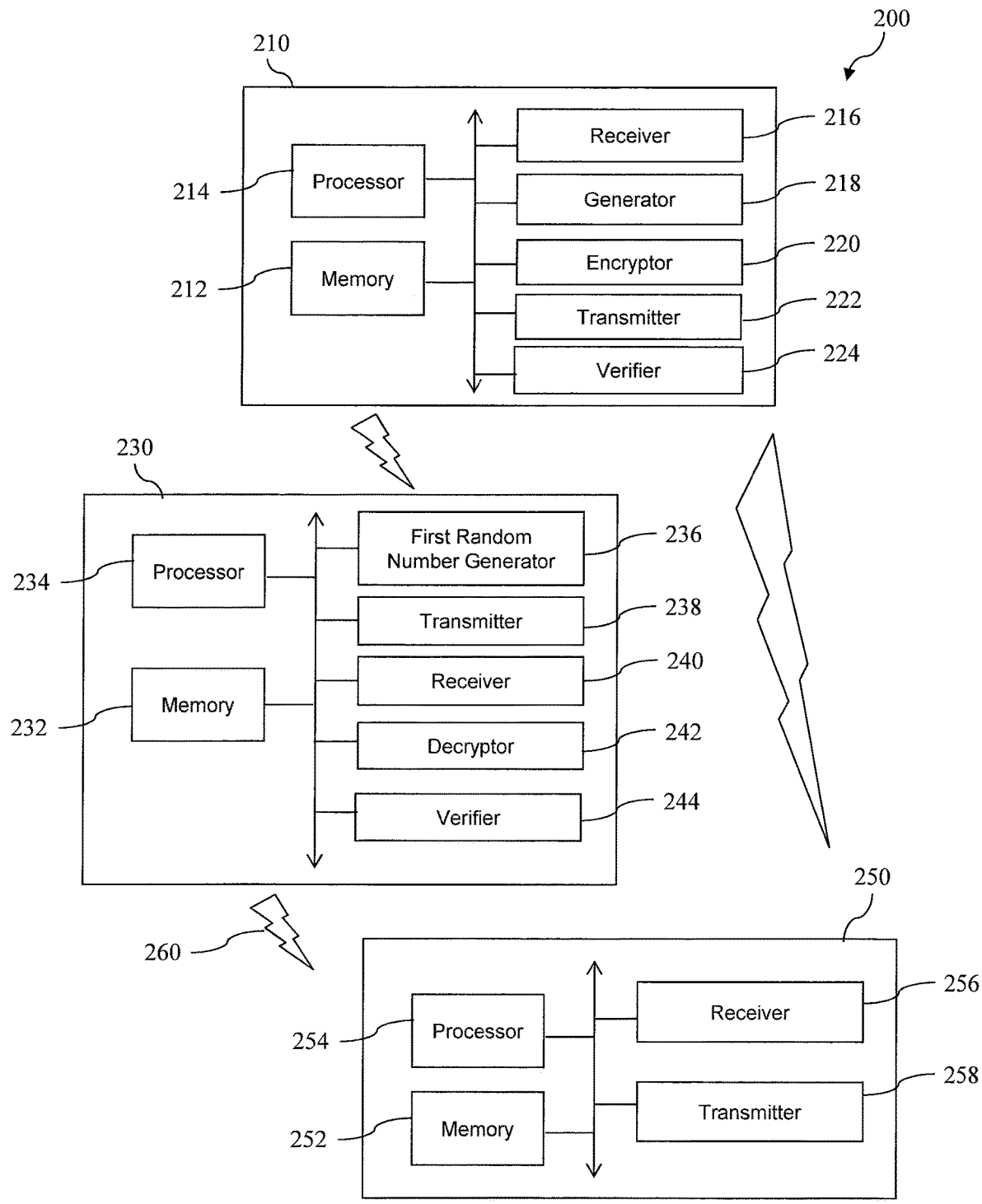
FIG. 2 depicts a schematic block diagram of a system according to various embodiments of the present invention, such as corresponding to the method of performing authentication for a transaction shown in FIG. 1.

FIG. 2 depicts a schematic block diagram of a system 200 according to various embodiments of the present invention, such as corresponding to the method 100 of performing authentication for a transaction as described hereinbefore according to various embodiments of the present invention.

The system 200 comprises a server 210 (e.g., may be referred to as an authentication server), a first device 230 capable of communicating with the server 210, and a second device 250 capable of communicating with the server 210.

The first device 230 comprises a memory 232; and at least one processor 234 communicatively coupled to the memory and configured to: generate a first random number and encrypting the first random number based on a first key (e.g., a public key) of a first private-public key pair (e.g., generated for or in relation to a server 210); send the encrypted first random number to the server 210; receive a transaction identifier for the transaction, the first random number and a second random number from the server 210, whereby the transaction identifier, the first random number and the second random number are encrypted based on a first key (e.g., a public key) of a second private-public key pair (e.g., generated for or in relation to the first device 210); decrypt the encrypted transaction identifier, the encrypted first random number and the encrypted second random number received based on a second key (e.g., a private key) of the second private-public key pair; verify the first random number decrypted; and send the transaction identifier, and the second random number to the second device 250 via a communication channel 260 between the first and second devices for authenticating the first device 230 for the transaction based on the second random number.

It will be appreciated by a person skilled in the art that the at least one processor 234 may be configured to perform the required functions or operations through set(s) of instructions (e.g., software modules) executable by the at least one processor 234 to perform the required functions or operations. Accordingly, as shown in FIG. 2, the first device 230 may further comprise a first random number generator 236 configured to generate a first random number and encrypting the first random number based on a first key (e.g., a public key) of a first private-public key pair (e.g., generated for or in relation to a server 210); a transmitter 238 configured to send the encrypted first random number to the server 210; a receiver 240 configured to receive a transaction identifier for the transaction, the first random number and a second random number from the server 210, whereby the transaction identifier, the first random number and the second random number are encrypted based on a first key (e.g., a public key) of a second private-public key pair (e.g., generated for or in relation to the first device 210); a decryptor 242 configured to decrypt the encrypted transaction identifier, the encrypted first random number and the encrypted second random number received based on a second key (e.g., private key) of the second private-public key pair; and a verifier 244 configured to verify the first random number decrypted. The transmitter 238 may also be configured to send the transaction identifier, and the second random number to the second device 250 via a communication channel 260 between the first and second devices for authenticating the first device 230 for the transaction based on the second random number.

It will be appreciated by a person skilled in the art that the above-mentioned modules are not necessarily separate modules, and one or more modules may be realized by or implemented as one functional module (e.g., a circuit or a software program) as desired or as appropriate without deviating from the scope of the present invention. For example, the receiver 240 and the transmitter 238 may be realized as a transceiver. For example, the one or more modules may be realized (e.g., compiled together) as one executable software program (e.g., software application or simply referred to as an "app"), which for example may be stored in the memory 232 and executable by the at least one processor 234 to perform the functions/operations as described herein according to various embodiments.

In various embodiments, the system 200 corresponds to the method 100 as described hereinbefore with reference to FIG. 1, therefore, various functions or operations configured to be performed by the at least one processor (e.g., the at least one processor 234 of the first device 230, the at least processor 254 of the second device 250 and/or the at least one processor 214 of the server 210) may correspond to various steps of the method 100 described hereinbefore according to various embodiments, and thus need not be repeated with respect to the system 200 for clarity and conciseness. In other words, various embodiments described herein in context of the methods are analogously valid for the respective systems or devices, and vice versa.

For example, as shown in FIG. 2, the second device 250 comprises a memory 252; and at least one processor 254 communicatively coupled to the memory 252 and configured to (according to various first embodiments): receive a first identifier associated with the first device 230 from the first device 230; send the transaction identifier and the first identifier to the server 210; receive the third random number associated with the second device 250 from the server 210, whereby the third random number is encrypted based on a first key (e.g., public key) of a third private-public key pair (e.g., generated for or in relation to the second device 250); and send the second random number received from the first device 230 to the server 210 for authenticating the first device for the transaction based on the second random number, as described hereinbefore with respect to the method 100.

For example, in various second embodiments, the at least one processor 254 communicatively coupled to the memory 252 may instead be configured to send the transaction identifier and the second random number to the server 210 for authenticating the first device for the transaction based on the second random number, as described hereinbefore with respect to the method 100.

Accordingly, as shown in FIG. 2, the second device 250 may further comprise a receiver 256 and a transmitter 258 configured to perform the functions/operations as described herein according to various embodiments.

For example, as shown in FIG. 2, the server 210 comprises a memory 212; and at least one processor 214 communicatively coupled to the memory 212 and configured to (according to various first embodiments): receive the transaction identifier and the first identifier from the second device 250; generate the second random number associated with the first device 230 and the third random number associated with the second device 250; encrypt the second random number and the third random number based on the first key (e.g., the public key) of the second private-public key pair and the first key (e.g., the public key) of the third private-public key pair, respectively; send the encrypted second random number and the encrypted third random number to the first device 230 and the second device 250, respectively; and receive the second random number and the third random number from the second device 250 and the first device 230, respectively, for authenticating the first device 230 and the second device 250 for the transaction based on the second random number and the third random number.

Accordingly, as shown in FIG. 2, the server 210 may further comprise a receiver 216, a generator 218, an encryptor 220, a transmitter 222 and a verifier 224 configured to perform the functions/operations as described herein according to various embodiments.

For example, in various embodiments, the memory 212 of the server 210 may have stored therein one or more of the functional modules of the server 210 as described herein according to various embodiments, the memory 232 of the first device 230 may have stored therein one or more of the functional modules of the first device 230 as described herein according to various embodiments, and the memory 252 of the second device 250 may have stored therein one or more of the functional modules of the second device 250 as described herein according to various embodiments, which are executable by the respective processor to perform the corresponding functions/operations as described herein.

A computing system/device, a controller, a microcontroller or any other system/device providing a processing capability may be provided according to various embodiments in the present disclosure. Such a system/device may be taken to include one or more processors and one or more computer-readable storage mediums. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "generating", "sending", "receiving", "decrypting", "encrypting", "verifying", or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a system, a device or an apparatus for performing the operations/functions of the methods described herein. Such a system, device or apparatus may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention. It will be appreciated by a person skilled in the art that various modules described herein (e.g., the first random number generator 236, the transmitter 238, the receiver 240, the decryptor 242 and/or the verifier 244 of the first device 230, the receiver 216, the generator 218, the encryptor 220, the transmitter 222 and/or the verifier 224 of the server 210, the receiver 256 and/or the transmitter 258 of the second device 250) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions executable by one or more computer processors to perform the method 100 of performing authentication for a transaction as described hereinbefore with reference to FIG. 1 according to various embodiments. Accordingly, various computer programs or modules described herein may be stored in a computer program product receivable by a system (e.g., a computer system or an electronic device) therein, such as the server 210, the first device 230 and the second device 250 as shown in FIG. 2, for execution by the respective processor to perform the required or desired functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 3:
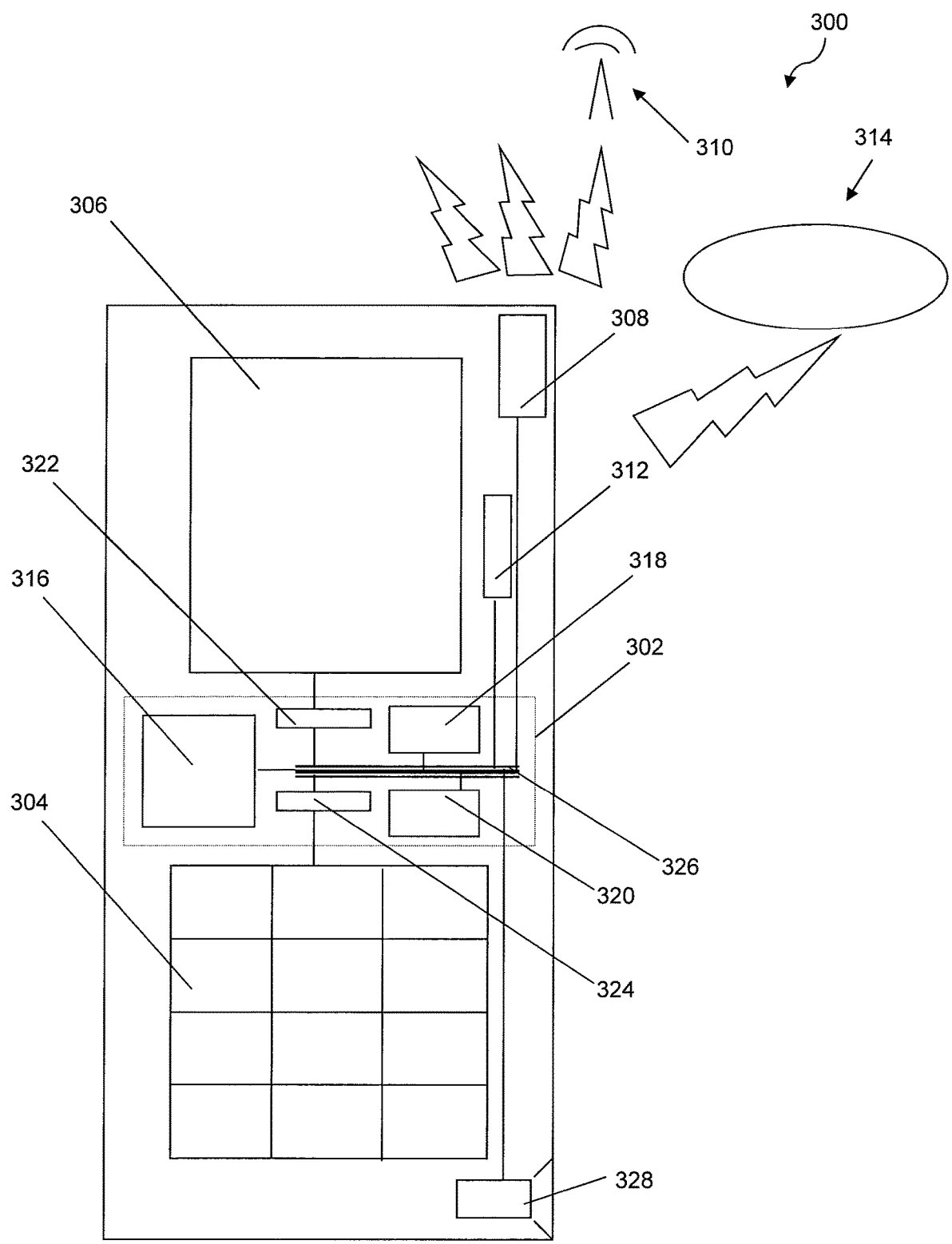
FIG. 3 depicts a schematic block diagram of an exemplary communication device in which the method of performing authentication for a transaction according to various example embodiments may be implemented.

In various embodiments, the first device and/or the second device may be realized by any computing device, such as an exemplary communication device 300 as schematically shown in FIG. 3 as an example only and without limitation. Various methods/steps or functional modules (e.g., in the case of the first device 230, the first random number generator 236, the transmitter 238, the receiver 240, the decryptor 242 and/or the verifier 244) may be implemented as software, such as a computer program being executed within the communication device 300, and instructing the communication device 300 (in particular, one or more processors therein) to conduct the methods/functions of various embodiments described herein. The communication device 300 may comprise a processor module 302, an input module such as a keypad 304 and an output module such as a display 306. The processor module 302 may be coupled to a first communication unit 308 for communication with a cellular network 310. The first communication unit 308 can include but is not limited to a subscriber identity module (SIM) card loading bay. The cellular network 310 can, for example, be a 3G, 4G or a higher generation network. The processor module 302 may further be coupled to a second communication unit 312 for connection to a local area network 314. For example, the connection can enable wired/wireless communication and/or access to e.g. the Internet or other network systems such as Local Area Network (LAN), Wireless Personal Area Network (WPAN) or Wide Area Network (WAN). The second communication unit 312 can include but is not limited to a wireless network card or an eternet network cable port. The processor module 302 in the example includes a processor 316, a Random Access Memory (RAM) 318 and a Read Only Memory (ROM) 320. The processor module 302 also includes a number of Input/Output (I/O) interfaces, for example I/O interface 322 to the display 306, and I/O interface 324 to the keypad 304. The components of the processor module 302 typically communicate via an interconnected bus 326 and in a manner known to the person skilled in the relevant art. For example, the computer program may be downloaded to the communication device 300 via the cellular network 310 or the local area network 314 or may be supplied to the communication device 300 via a data storage medium having the computer program recorded thereon such as a flash memory module or memory card/stick and read by the communication device 300 utilizing a corresponding memory reader-writer of a data storage device 328. The application program is read and controlled in its execution by the processor 316. For example, intermediate storage of program data may be accomplished using RAM 318.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter.

Rather, these example embodiments are provided so that this disclosure will be thorough and complete, and will fully convey the scope of the present invention to those skilled in the art.

Various example embodiments of the present invention present a lightweight but secure 2-Factor authentication method to perform authenticate for a transaction with at least two physical parties present in the same space (in the vicinity of each other, e.g., within near-field communication (NFC) or visual communication range) to transact using their connected devices (internet connected devices). The direct data exchange between the connected devices may be based on a wireless communication (e.g., a two-way wireless communication channel, such as but not limited to, NFC) or based on a visual communication channel (e.g., a one-way visual communication channel, such as but not limited to, QR code).

Various example embodiments of the present invention provide an authentication system that allows two connected devices to authenticate each other before performing any transaction(s). For example, the authentication protocol/method according to various example embodiments provides a number of advantages over the conventional solutions, such as but not limited to:

Lightweight: the authentication method may only require two rounds of communications between with two connected devices.

Standard communication channels: the authentication method can be easily implemented based on various direct communication channels between the two connected devices, such as wireless communication channel or visual communication channel.

No password memorization: the authentication method include cryptographic challenge response and thus does not require password memorization.

Rigorous security: the authentication method provides strong security against various kinds of attack including man-in-the-middle attack, replay attack, and spoofing attack.

There exist various conventional protocols/methods for authentication using connected mobile devices. For example, various conventional methods involve the use of OTP (one-time passwords) generated on mobile application for use in authentication, such as with banks. Various conventional methods involve the use of combined 2D barcodes and camera-telephones to implement a visual communication channel for authentication and demonstrative identification of devices. However, such conventional methods provide the same security level as conventional password-based methods and are vulnerable to, for example, spoofing attacks.

For example, on the mobile payment landscape, different solutions for authentication scheme have been developed as a subsystem of a commercialized payment system. For example, Google Wallet, Samsung Pay and Apple Pay appear to be based on similar authentication methods. Briefly, the applications allow the user to store their payment card securely in the payment system, whereby the mobile phone itself store a tokenization of the payment card. When processing a transaction, the tokenization of the payment card and a cryptogram are sent wirelessly to the point-of-sale terminal of the merchant. The terminal validates the information of the tokenization, and then send user information to the bank for processing. In this regard, a valid cryptogram can only be computed from the authenticated devices. However, such an authentication approach, while enhancing the security for the payer, does not take into consideration potential attack from the payee side. Moreover, such an authentication approach is complex and heavily relies on various service providers, and as such, single point of failure might affect to the entire system. In contrast, various example embodiments of the present invention advantageously provide a simpler authentication approach while providing rigorous security to the system.

For better understanding of the present invention and without limitation or loss of generality, various example embodiments of the present invention will now be described with respect to an authentication method being applied for a transaction relating to a mobile payment between two parties (person-to-person (P2P) payment system). However, as mentioned hereinbefore, it will be appreciated by a person skilled in the art that the present invention is not limited to being applied to transactions involving mobile payment, and may be applied to various other types of transactions, as long as authentication is required or desired between at least two parties involved in the transaction.

In particular, various example embodiments will now be described based on an example scenario of authenticating at least one of two mobile communication devices (corresponding to two mobile users, e.g., Alice and Bob), when they wish to perform a mobile payment transaction. In various example embodiments, the two devices should be physically near each other when the transaction takes place. Moreover, the same authentication response should not be able to be use twice (i.e., replay attack), and an unauthenticated device cannot bypass the authentication process (i.e., impersonation attack).

In various example embodiments, each user (or the associated device) first undergoes a registration process in order to identify itself with a server (e.g., corresponding to the "server" as described herein according to various embodiments, which may also be referred to as a payment server in the context of these example embodiments). Accordingly, an identity is created and stored in the server for each user (or the associated device).

A registration process according to various example embodiments will now be described. For example, instead of using traditional passwords such as PIN numbers, a payment application configured to perform the transaction (and to perform the authentication method according to various embodiments of the present invention) is configured to generate private/public key pair for the user upon installation on the device.

For example, various example embodiments leverage the RSA technique (e.g., as described in Rivest et al, "A Method for Obtaining Digital Signatures and Public-Key cryptosystems", Communiations of the ACM, vol. 21, no. 2, page 120-126, 1978, the content of which being hereby incorporated by reference in its entirety for all purposes) with optimal asymmetric encryption padding (OAEP) (e.g., as described in Bellare et la., "Optimal Asymmetric Encryption—How to Encrypt with RSA", Advances in Cryptology—Eurocrypt 94 Proceedings, Lecture Notes in Computer Science, Vol. 950, A. De Santis ed., Springer-Verlag, 1994, the content of which being hereby incorporated by reference in its entirety for all purposes) as the cryptosystem for encryption/decryption as well as for digital signature due to its simplicity. In general, the RSA cryptosystem includes three key functions/algorithms:

Key Generation: KeyGen($\lambda$)→(pk, sk)—this algorithm is configured to input a security parameters ($\lambda$) and output a pair of keys (pk, sk) as public and private key.

Encryption: Enc(pk, m)→(c)—this algorithm is configured to input the public key and a message m and output a ciphertext c.

Decryption: Dec(sk, c)→(m)—the algorithm is configured to input the private key and a ciphertext c and output a message m, whereby if pk and sk are a private-public key pair, Dec(sk, Enc(pk, m))=(m)

In various example embodiments, the RSA cryptosystem (with private-public key pair (pk, sk)) is also utilized to develop a digital signature scheme, that includes two key functions/algorithms:

Signature Generation: Sign(sk, m)→s—this algorithm is configured to input the private key and a message m and output a signature s.

Signature Verification: Verify(pk, s, m)→{1,0}—this algorithm is configured to input a signature s, a message m and a public key pk and determine/verify the correctness of the signature s.

For example, the digital signature scheme is able to ensure that the message m is correctly sent by the owner of public key pk without any modification thereto.

In the registration process with the server, the payment application may be configured to generate a RSA key pair (pk, sk) for a user (or the associated device). In this regard, the private key sk is safely stored in a storage of the associated device, while the public key pk is sent to the server for storage therein in a server database as being associated with the user. At the same time, the user's device receives the server's public key and stores it into the local database as being associated with the server.

Figure 4:
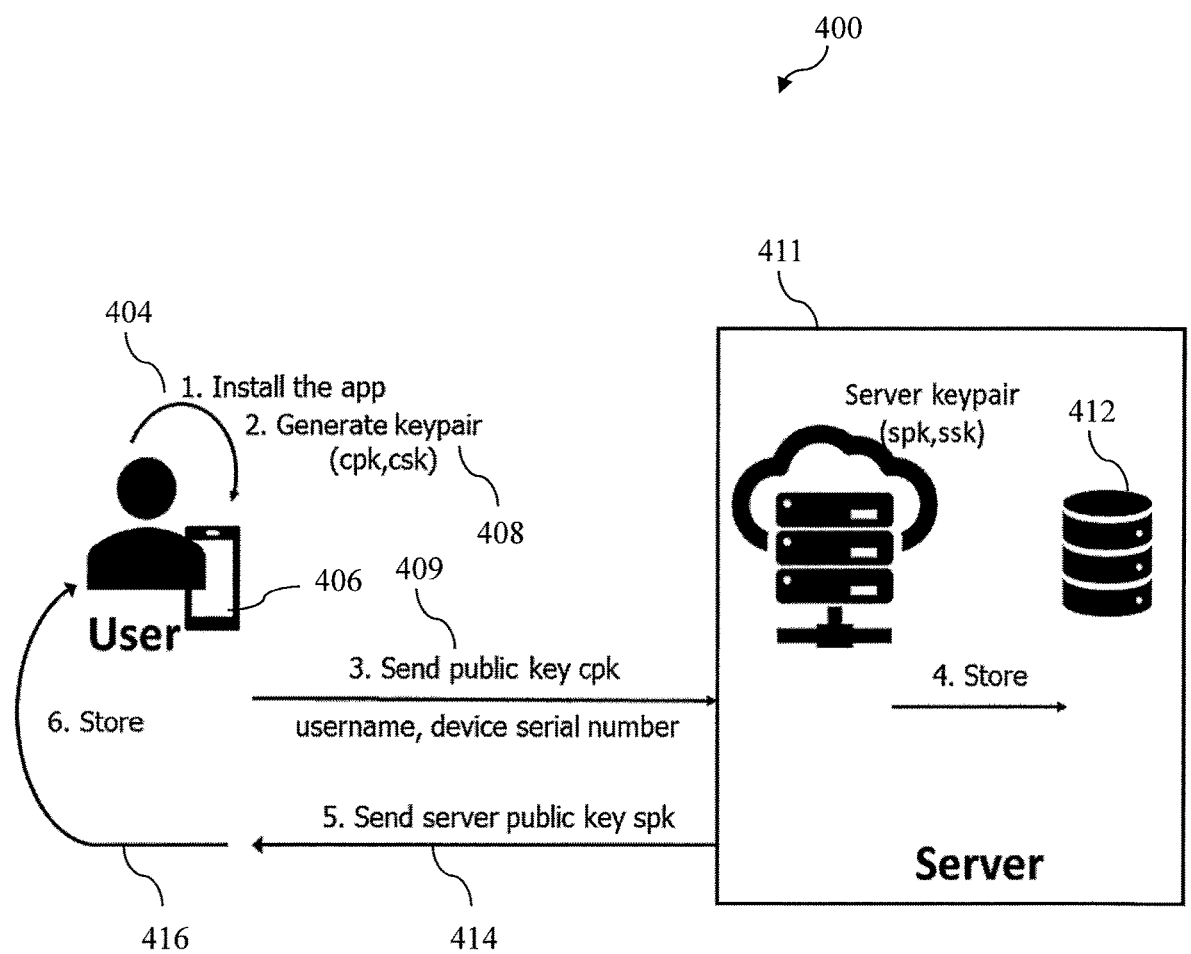
FIG. 4 depicts a schematic flow diagram relating to a registration process with a server for a user according to various example embodiments of the present invention.

For illustration purpose only and without limitation, FIG. 4 depicts a schematic flow diagram relating to a registration process with a server for a user according to various example embodiments of the present invention. As a first step 402, a user may install a payment application for performing a payment transaction on the user's mobile communication device 406 (the payment application also has been configured to perform the authentication method according to various embodiments of the present invention). Upon installation, as a second step 408, the payment application may be configured to generate a private-public key pair (csk, cpk) in relation the user. The private key csk may then be stored in a storage of the device 406. As a third step 409, the public key cpk may be sent to the server 411, and as a fourth step 410, the public key cpk received by the server 411 may be stored in a server database 412 as described hereinbefore. Similarly, the server 411 may also generate a private-public key pair (ssk, spk) in relation to the server 411. The private key ssk may be stored in a database 412 of the server 410. As a fifth step 414, the public key spk may be sent to the device 406, as a sixth step 416, the public key spk received by the device 406 may be stored in a storage of the device 406.

Accordingly, in this manner, users (or the associated devices) that are party to a transaction to be conducted are each registered with the server facilitating the transaction such that the server has stored therein public keys of the users and the devices of the users each has stored therein the public key of the server.

The exemplary scenario of authenticating at least one of two devices (corresponding to two mobile users, e.g., Alice and Bob) will now be further described with the private-public key pair of Alice denoted as ($pk_A$, $sk_A$) (e.g., corresponding to the "third private-public key pair" described herein before according to various embodiments), the private-public key pair of Bob denoted as ($pk_B$, $sk_B$) (e.g., corresponding to the "second private-public key pair" described herein before according to various embodiments) and the private-public key pair of the server denoted as ($pk_S$, sks) (e.g., corresponding to the "first private-public key pair" described herein before according to various embodiments).

In order to perform a payment transaction between Alice (e.g., payer) and Bob (e.g., payee), the authentication process may be performed based on a wireless communication channel (e.g., a two-way wireless communication channel, such as but not limited to, NFC) or a visual communication channel (e.g., a one-way visual communication channel, such as but not limited to QR code). For better understanding and without limitation, a first example authentication method based on a two-way wireless communication channel between the two devices (e.g., corresponding to various first embodiments as described hereinbefore) for a transaction and a second example authentication method based on a visual communication channel between the two devices (e.g., corresponding to various second embodiment as described hereinbefore) for a transaction will now be described.

Two-Way Wireless Communication Channel

Figure 5:
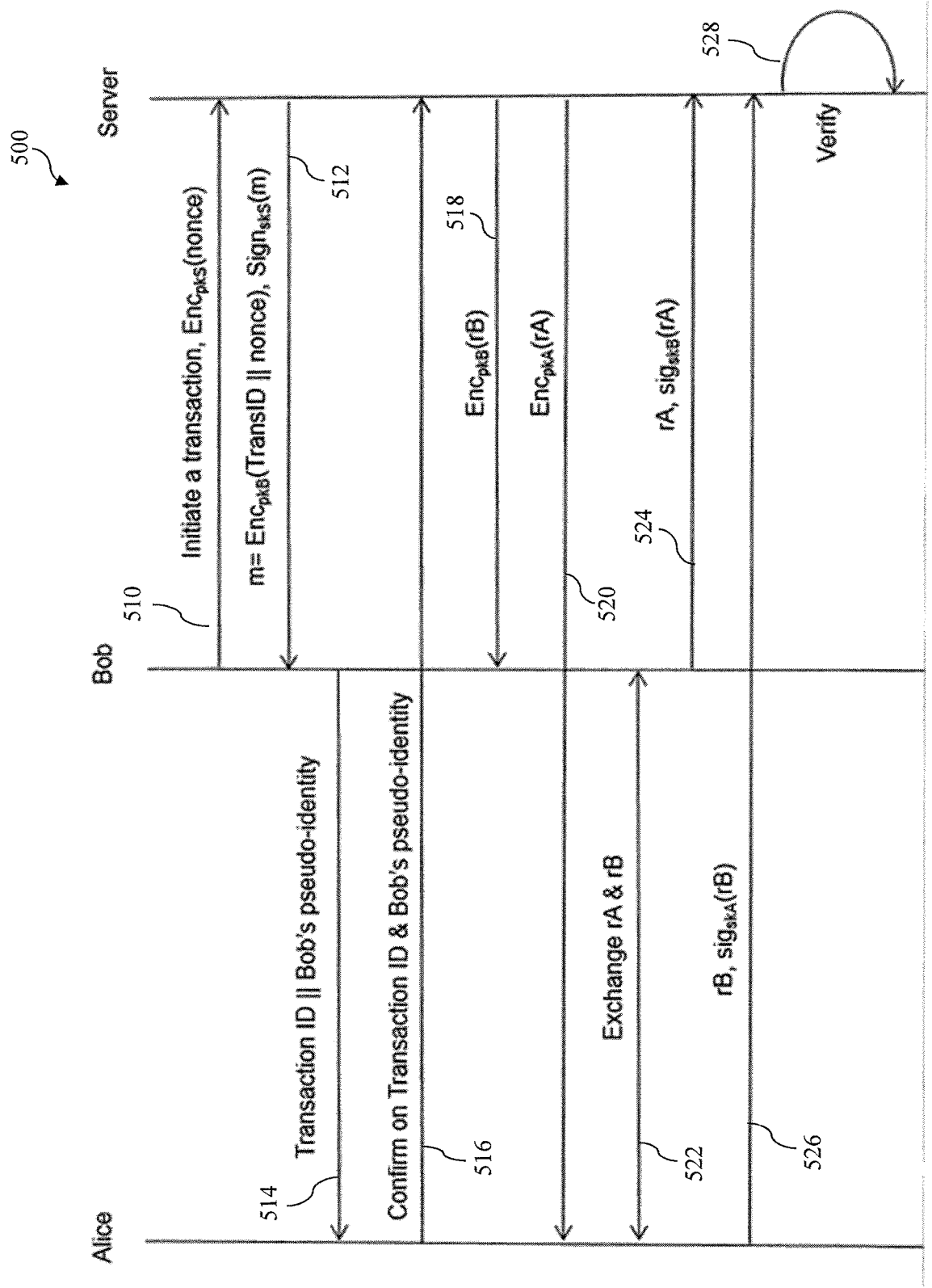
FIG. 5 depicts a flow diagram of a first example authentication method based on a two-way wireless communication channel between two users' devices for a transaction according to an example embodiment of the present invention.

FIG. 5 depicts a flow diagram of the first example authentication method 500 based on a two-way wireless communication channel between two users's device, Alice (payer) and Bob (payee), for a transaction according to an example embodiment of the present invention. According to the example embodiment, the first example authentication method 500 may include the steps as described below, whereby Alice and Bob agree on a transaction with Bob being the payee and Alice being the payer.

At step 510, Bob's device may initiate the transaction or authentication process. In this regard, Bob's device may generate a random nonce (e.g., random integer number, such as corresponding to the "first random number" as described hereinbefore according to various embodiments) and then encrypt the random nonce using the server's public key, that is, $Enc_{pkS}$(nonce). Bob's device may then send a message to initiate the transaction or authentication process to the server, together with the encrypted random nonce ($Enc_{pkS}$(nonce)). In this regard, Bob's identity (e.g., an identifier of Bob's device, which may correspond to the "first identifier" as described hereinbefore according to various embodiments) may be known (e.g., implicitly known or received) to the server when server receives the encrypted random nonce from Bob so it may not be necessarily for Bob to explicitly send its identifier to the server. From step 510, Bob has thus initiated the transaction or authentication process and informed to the server that Bob is to be a recipient of a payment in the transaction.

At step 512, in response to the initialization message from Bob's device, the server may generate a random transaction identifier (transactionID) (e.g., corresponding to the "transaction identifier" as described hereinbefore according to various first embodiments) for the transaction and decrypt the encrypted random nonce received using the server's secret key. The server may then send an encrypted message including the random transaction identifier generated and the random nonce decrypted to Bob's device (i.e., m=$Enc_{pkB}$(transactionID∥nonce)), together with a digital signature of the message based on the server's secret key (i.e., $Sig_{skS}$(m)). In the message, the random transaction identifier and the random nonce may be concatenated, and the message may be encrypted using Bob's public key. At this stage, for example, a pending transaction may thus be created, which may be stored as a transaction dataset (e.g., a transaction entry) relating to the pending transaction in the server. For example, the transaction dataset may include the transaction identifier and the identifier of Bob's device (e.g., Bob's pseudo-identity, such as a phone number, a username, an email address, and so on). In other words, these information relating to the transaction may be stored as meta-data associated with the transaction. In various example embodiments, the pending transaction may time out after a certain time interval. Furthermore, at this stage, the server knows that Bob is a recipient of a payment in the transaction, but does not yet know who is the payer of the payment.

Upon receiving the message from the server, Bob's device decrypts the message and verifies the digital signature and the decrypted random nonce. In this regard, the digital signature may be verified based on the signature verification algorithm as mentioned hereinbefore, and the decrypted random nonce may be verified by comparing it with initial random nonce generated by Bob's device. For example, if either the verification of the digital signature or the random nonce is unsuccessful, the authentication process may be terminated and the authentication may be deemed unsuccessful.

At step 514, if the verification of the digital signature and random nonce is successful, Bob's device may send the transaction identifier and Bob's identifier to Alice's device. In various example embodiments, upon receiving the transaction identifier and Bob's identifier, Alice may then verify them with Bob. For example, if it is the first time that Alice receives the transaction identifier, Alice may verify the transaction identifier and Bob's identifier with Bob based on any one of a number of ways, such as NFC, QR code, phone call, verbal speech, messaging, email, and so on. As an example, in the case of Alice using NFC to verify Bob's identifier (pseudo-identity), Bob's device may emit an NFC electromagnetic radio signal (e.g., through an application in the device) embodying Bob's identifier. Alice's device may be set to electromagnetic radio signal detection mode (through an application in the device) and is placed near Bob's device in close proximity. Alice's device may thus detect the electromagnetic radio signal from Bob's device and checks/compares Bob's identifier extracted from the electromagnetic radio signal with the previously received Bob's identifier sent by Bob. If a match occurs, Alice verifies that the device (which Alice's device has been placed in close proximity to) is Bob's device, and thus successfully verifies Bob's identifier. As another example, in the case of Alice using QR code to verify Bob's identifier (pseudo-identity), Bob's device may display a visual QR code (through an application in the device) embodying Bob's identifier. Alice's device may be set to QR code capturing mode (through an application in the device) and its camera scans/captures the QR code being displayed on Bob's device. Alice's device may thus read the QR code from Bob's device and checks/compares Bob's identifier extracted from the QR code with the previously received Bob's identifier sent by Bob. If a match occurs, Alice verifies that the device (which Alice's device has captured the QR code from) is Bob's device, and thus successfully verifies Bob's identifier. If the transaction identifier and Bob's identifier are successfully verified, they may then be stored in Alice's device for subsequent use in relation to the transaction with Bob for verification. On the other hand, if verification of the transaction identifier and Bob's identifier is unsuccessful, the authentication process may be terminated.

At step 516, Alice's device may send a confirmation message to the server, including the transaction identifier and Bob's identifier. In this regard, similar to Bob's identifier as explained above, Alice's identifier (e.g., an identifier of Alice's device, which may correspond to the "second identifier" as described hereinbefore according to various embodiments) may be known (e.g., implicitly known or received) to the server when server receives a message from Alice so it may not be necessarily for Alice to explicitly send its identifier to the server. Upon receiving the confirmation message, the server may verify the existence of the transaction by attempt to match the information received (transaction identifier and/or Bob's identifier) with the transaction data (e.g., transaction entry) stored at the server for the transaction. If the match is successful for the transaction (e.g., both the transaction identifier and Bob's identifier match the transaction data stored for the transaction), Alice's identifier may then be added to the transaction data associated with the transaction stored at the server. Otherwise, the authentication process may be terminated and the authentication may be deemed unsuccessful.

If the match is successful, the server may generate a random number (rA) for Alice (e.g., corresponding to the "third random number" as described hereinbefore according to various embodiments) and a random number (rB) for Bob (e.g., corresponding to the "second random number" as described hereinbefore according to various embodiments) for authenticating Alice's and Bob's devices. In this regard, the two random numbers (rA and rB) generated may also be added to the transaction dataset (e.g., the transaction entry) associated with the transaction.

In steps 518 and 520, the server may send the random number rB to Bob's device and the random number rA to Alice's device, respectively. In this regard, the random number rB may be encrypted by the server using Bob's public key before being sent to Bob's device, and the random number rA may be encrypted by the server using Alice's public key before being sent to Alice's device.

Alice's and Bob's devices each receive the respective encrypted random number, decrypts the respective encrypted random number to obtain the respective random number.

In step 522, Alice's and Bob's devices perform two-way wireless communications (e.g., NFC) to exchange their respective random number. Accordingly, after the random number exchange, Alice's device obtains random number rB and Bob's device obtains random number rA.

In step 524, Alice's device sends the random number rB, with a digital signature of the random number ($Sig_{skA}(rB)$), to the server for authenticating Bob's device, and in step 526, Bob's device sends the random number rA, with a digital signature of the random number ($Sig_{skB}(rA)$), to the server for authenticating Alice's device.

In step 528, the server verifies the random number rB and the digital signature received from Alice and verifies the random number rA and the digital signature received from Bob. For example, the random number received may be verified by comparing to the corresponding initial random number generated by the server (e.g., stored in the corresponding transaction data relating to the transaction), and the digital signature received may be verified based on the signature verification algorithm mentioned hereinbefore. If the verification of the two random numbers and the two digital signatures is successfully, Alice's and Bob's devices may then be deemed to be successfully verified for the transaction, and then transaction (e.g., payment transaction from Alice to Bob) may thus be allowed to proceed. Otherwise, if the verification of any of the above-mentioned information is not successful, the authentication process may be terminated and the authentication may be deemed unsuccessful.

As an example, based on the first example authentication method 500 described above, a real-time transactional method between two parties (a first party and a second party) may be provided, each with a respective first and second wireless mobile device and a respective first and second identifier (e.g., digital ID, such as but not limited to IMEI number associated with the device, IMSI number associated with the device, phone number, email address and/or username, and so on), both mobile devices capable of communicating wirelessly with a server which has a registered first party key (e.g., first party's public key) and a registered second party key (e.g., second party's public key). The transaction method has a 2-Factor Authentication, and includes the following steps:
  a) initiating a transaction by the first party using the first wireless mobile device to generate and send a random nonce encrypted with a server key to the server, whereby the server returns to the first mobile device, an encrypted message comprising a random transactional ID concatenated with the random nonce, encrypted with the first party key, along with a digital signature of the encrypted message;
  b) transferring of the random transactional ID and first party digital ID by the first party to the second party from the first mobile device to the second mobile device via a wireless communication means (e.g., direct two-way wireless communication channel) and confirmation of the random transaction ID and first party digital ID by the second party with the server;
  c) generating, by the server, an encrypted first random number using the first party key and sending it to the first party;
  d) generating, by the server, an encrypted second random number using the second party key and sending it to the second party;
  e) decrypting, by both the first and second parties, their respective random number and exchange them through their respective mobile device via the wireless communication means together with their respective digital ID;
  f) sending, by the first party, the second random number and the second digital ID to the server, and sending, by the second party, the first random number and first digital ID to the server; and
  g) verifying, by the server, the random numbers received, and executing the transaction if the verification is successful.

One-Way Visual Communication Channel

Figure 6:
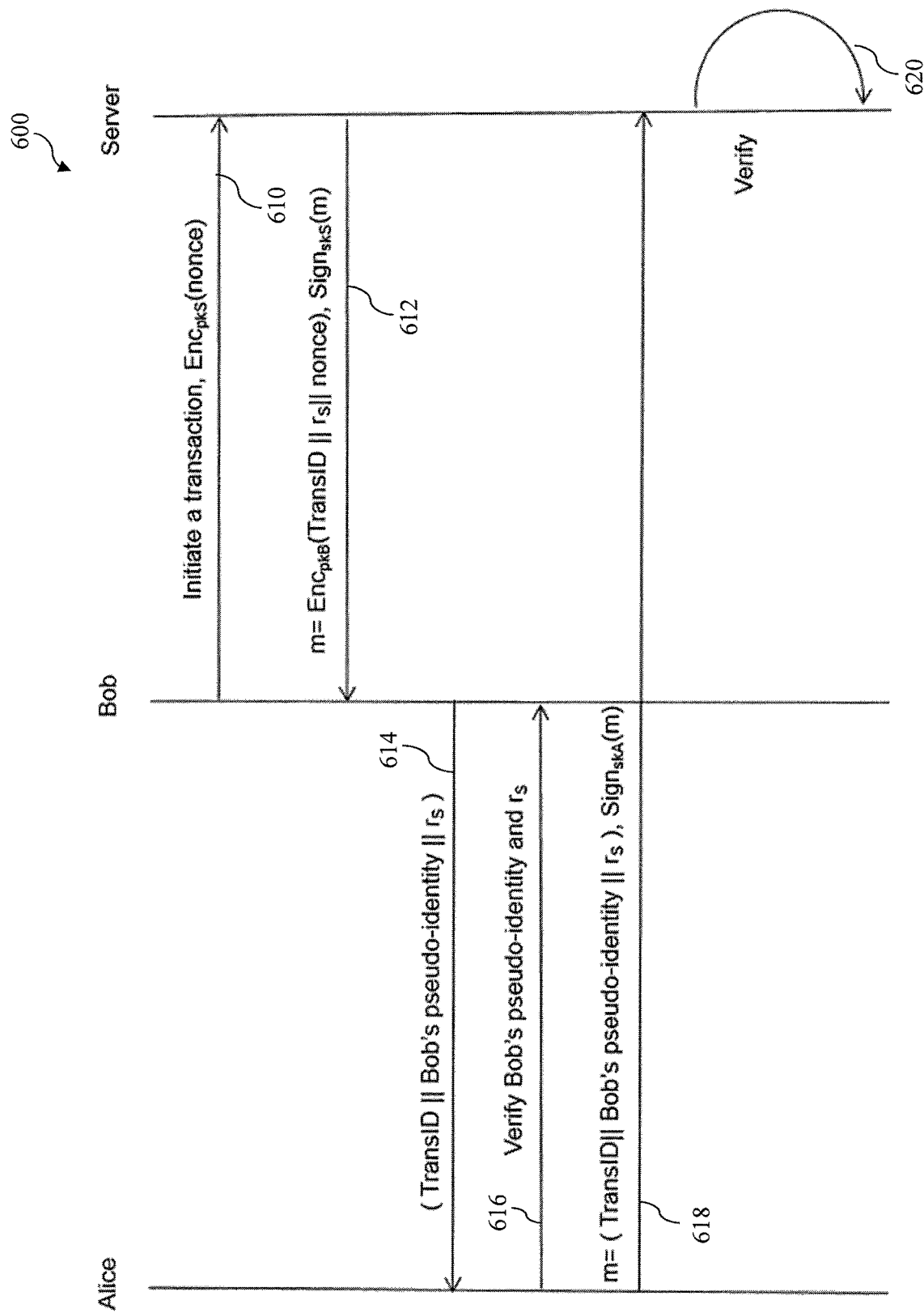
FIG. 6 depicts a flow diagram of a second example authentication method based on a one-way visual communication channel between two users' devices for a transaction according to an example embodiment of the present invention.

FIG. 6 depicts a flow diagram of the second example authentication method 600 based on a one-way visual communication channel between two users's devices, Alice (payer) and Bob (payee), for a transaction according to an example embodiment of the present invention. According to the example embodiment, the second example authentication method 600 may include the steps as described below, whereby Alice and Bob agree on a transaction with Bob being the payee and Alice being the payer. The example authentication method may require Alice and Bob to be physically near each other (in close proximity or within a range of the one-way visual communication channel).

At step 610, Bob's device may initiate the transaction or authentication process. In this regard, Bob's device may generate a random nonce (e.g., random integer nonce, such as corresponding to the "first random number" as described hereinbefore according to various embodiments) and then encrypts the random nonce using the server's public key, that is, $\text{Enc}_{pkS}(\text{nonce})$. Bob's device may then send a message to initiate the transaction or authentication process to the server, together with the encrypted random nonce ($\text{Enc}_{pkS}(\text{nonce})$). In this regard, as explained hereinbefore, Bob's identity (e.g., an identifier of Bob's device, which may correspond to the "first identifier" as described hereinbefore according to various embodiments) may be known (e.g., implicitly known or received) to the server when server receives the encrypted random nonce from Bob so it may not be necessarily for Bob to explicitly send its identifier to the server. From step 610, Bob has thus initiated the transaction or authentication process and informed the server that Bob is to be a recipient of a payment in the transaction.

At step 612, in response to the initialization message from Bob's device, the server may generate a random transaction identifier (transaction ID) (e.g., corresponding to the "transaction identifier" as described hereinbefore according to various second embodiments) and a random number $r_S$ (e.g., corresponding to the "second random number" as described hereinbefore according to various second embodiments) for the transaction, and decrypt the encrypted random nonce received using the server's secret key. The server may then send an encrypted message including the random transaction identifier generated, the random number $r_S$ generated and the random nonce decrypted to Bob's device (i.e., $m=\text{Enc}_{pkS}(\text{transaction ID}\|r_S\|\text{nonce})$, together with a digital signature of the message based on the server's secret key ($\text{Sig}_{skS}(m)$). In the message, the random transaction identifier, the random number $r_S$ and the random nonce may be concatenated, and the message may be encrypted using Bob's public key. At this stage, for example, a pending transaction may thus be created, which may be stored as a transaction dataset (e.g., a transaction entry) relating to the pending transaction in the server. For example, the transaction dataset relating to the transaction may include the transaction identifier, the identifier of Bob's device and the random number $r_S$. In other words, these information relating to the transaction may be stored as meta-data associated with the transaction. Furthermore, at this stage, the server thus knows that Bob is a recipient of a payment in the transaction but does not yet know who is the payer of the payment.

Upon receiving the message from the server, Bob's device decrypts the message and verifies the digital signature and the decrypted random nonce. In this regard, the digital signature may be verified based on the signature verification algorithm as mentioned hereinbefore, and the decrypted random nonce may be verified by comparing it with initial random nonce generated by Bob's device. For example, if either the verification of the digital signature or the random nonce is unsuccessful, the authentication process may be terminated and the authentication may be deemed unsuccessful. Furthermore, only Bob who possesses the corresponding private key to decrypt the message encrypted by the server based on Bob's public key is able to obtain the correct transaction ID as well as the correct random number $r_S$.

At step 614, if the verification of the digital signature and random nonce is successful, Bob's device may send the transaction identifier, Bob's identifier and the random number $r_S$ to the Alice's device via a one-way visual communication channel (e.g., NFC or QR code capturing) from Bob's device to Alice's device.

In various example embodiments, upon receiving these information from Bob, at step 616, Alice may then verify them with Bob. For example, as Alice and Bob are in close proximity to each other, Alice may verify the correctness of the information received visually with Bob (e.g., visual comparison of information). If the verification is successful, the authentication may proceed further, otherwise, the authentication process may be terminated.

At step 618, Alice's device may send a message to the server, including the transaction identifier, Bob's identifier and the random number $r_S$, along with a digital signature of the message based on Alice's secret key (i.e., $Sig_{skA}(m)$). In this regard, similar to Bob's identifier as explained above, Alice's identifier (e.g., an identifier of Alice's device, which may correspond to the "second identifier" as described hereinbefore according to various embodiments) may be known (e.g., implicitly known or received) to the server when server receives a message from Alice so it may not be necessarily for Alice to explicitly send its identifier to the server.

At step 620, upon receiving the message, the server may verify the digital signature and the random number $r_S$ by comparing with the transaction data (e.g., transaction entry) stored at the server relating to the transaction. For example, the transaction data may be identified based on the transaction identifier and Bob's identifier received. For example, the random number $r_S$ received may be verified by comparing to the corresponding initial random number $r_S$ generated by the server (e.g., stored in the corresponding transaction data relating to the transaction), and the digital signature received may be verified based on the signature verification algorithm mentioned hereinbefore. If the verification of the random number $r_S$ and the digital signature is successfully, Bob's device may then be deemed to be successfully verified for the transaction, and then transaction (e.g., payment transaction from Alice to Bob) may thus be allowed to proceed. Otherwise, if the verification of any of the above-mentioned information is not successful, the authentication process may be terminated and the authentication may be deemed unsuccessful.

As an example, based on the second example authentication method 600 described above, a real-time transactional method between two parties (a first party and a second party) may be provided, each with a respective first and second wireless mobile device and a respective first and second identifier (e.g., digital ID, such as but not limited to IMEI number associated with the device, IMSI number associated with the device, phone number, email address and/or username, and so on), both mobile devices capable of communicating wirelessly with a server which has a registered first party key (e.g., first party's public key). The transaction method has a 2-Factor Authentication, and includes the following steps:

a) initiating a transaction by the first party using the first wireless mobile device to generate and send a random nonce encrypted with a server key to the server whereby the server returns to the first mobile device, an encrypted message comprising a random transactional ID concatenated with the random nonce, encrypted with the first party key, along with a digital signature of the encrypted message;

b) decrypting, by the first party, the first random number and verifying the first party digital ID and transmitting a set of transactional information comprising the random transaction ID, the decrypted random number and the first party digital ID to the second party wirelessly and the second party in turn, sending wirelessly, the set of transactional information to the server via the second mobile device;

c) verifying, by the server, the digital ID and random number, and executing the transaction if the verification is successful.

Accordingly, various embodiments of the present invention advantageously help to defend against various forms of attacks, such as impersonation attack, reply attack, and man-in-the-middle attack.

For example, an impersonation attack may relate a scenario whereby the payee attempts to pretend as others to receive the money or a scenario whereby the payer try to use the account of others to purchase. In this regard, for example and without limitation, the authentication method according to various embodiments includes public key cryptography challenge responses, and thus the only way to correctly respond to a challenge is by holding the corresponding public key. Assuming that the corresponding public key is safely stored in the devices, the authentication method is secure against impersonation attacks.

For example, a reply attack may relate to a scenario whereby a malicious user attempts to conduct a false transaction based on the information of the previous transaction. In this regard, for example and without limitation, the authentication method according to various embodiments includes transmitting at least one random number between the two devices (e.g., the "second random number" and/or the "third random number" as described hereinbefore according to various embodiments of the present invention) for authentication purpose. This has been found to help defend against reply attacks. For example, to complete the transaction the user(s) must provide answer for a fresh random challenge.

For example, the authentication method according to various embodiments can also help to defend against man-in-the-middle attack on communication links between the users and the server. For example, the attacker is not able to intercept and manipulate the communication between the server and Bob in order to trick Bob into executing a transaction initiated by him. For example, the random nonce and digital signature from the server help defend against such an attack.

In various example embodiments, as described hereinbefore, Alice manually verifies the identity of the payee (Bob). Hence, even when an attacker attempts to intercept and modify the communication (e.g., NFC) between Alice and Bob, the attacker is unlikely to success in tricking Alice to unintentionally perform a transaction with the attacker.

In various example embodiments, the authentication method may further include an access control layer configured to require biometric authentication. For example, adding biometric authentication can help to defend against a device theft attack whereby the mobile device is lost to an attacker and the attacker carries out a transaction with an account linked to the mobile device.

As mentioned hereinbefore, the authentication method according to various embodiments may be applied to any type of transaction whereby it is either necessary or desirable to verify or validate the identity of a user (e.g., a user's device) party to the transaction. For example, the authentication method according to various embodiments may be applied to a mobile payment system. For example, two ubiquitous types of mobile payments are person-to-merchant payment (e.g., Iris Wallet), and person-to-person payment (e.g., Venmo). In both types of mobile payments, authentication is a vital component of the whole payment process. The payer and/or the payee should be identified/verified before conducting the transaction. The authentication methods according to various embodiments of the present invention help enhance the security of the payment process so that, for example, the mobile users will no longer be affected by spoofing, phishing and replay attacks. Furthermore, due to its simplicity, it can be easily integrated into any mobile application requiring authentication. Furthermore, by eliminating the need of password (e.g., PIN) memorization and entering the password, the authentication system advantageously enhances the convenience or user-friendliness of the payment process, which is one of most important trait for any payment system.

By way of another example and without limitation, the authentication method according to various embodiments may be applied to a delivery system. For example, the customer is able to order an item online and wait for the delivery. When the item is delivered to the customer's location, an authentication method may be performed so that the customer is able to prove that he/she is the correct person to receive the item. Moreover, the customer is not able to deny that he/she did not receive the item since only the correct mobile device can successfully complete the authentication method.

The authentication method according to various embodiments may also be applied in, but are not limited to, food industry, rental services, and closed loop payment (e.g., Kofu and Starbucks outlets) for example.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A computer-implemented method of performing authentication for a transaction between a first device and a second device, the method comprising:
   generating, at the first device, a first random number and encrypting the first random number based on a first key of a first private-public key pair;
   sending, by the first device, the encrypted first random number to a server;
   receiving, at the first device, a transaction identifier for the transaction between the first device and the second device, the first random number and a second random number from the server, wherein the transaction identifier, the first random number and the second random number are encrypted based on a first key of a second private-public key pair;
   decrypting, at the first device, the encrypted transaction identifier, the encrypted first random number and the encrypted second random number received based on a second key of the second private-public key pair;
   verifying, at the first device, the first random number decrypted based on a comparison of the first random number decrypted with the first random number originally generated by the first device;
   sending, by the first device, the transaction identifier, and the second random number to the second device via a communication channel between the first and second devices for authenticating the first device for the transaction between the first device and the second device based on a comparison of the second random number received and sent by the second device to the server with the second random number originally generated by the server;
   receiving, at the second device, a first identifier associated with the first device from the first device;
   sending, by the second device, the transaction identifier and the first identifier to the server;
   receiving, at the second device, the third random number associated with the second device from the server, wherein the third random number is encrypted based on a first key of a third private-public key pair;
   sending, by the second device, the second random number received from the first device to the server for authenticating the first device for the transaction based on the comparison of the second random number sent by the second device to the server with the second random number originally generated by the server, the second random number being associated with the first device;
   receiving, at the server, the transaction identifier and the first identifier from the second device;
   generating, at the server, the second random number associated with the first device and the third random number associated with the second device;
   encrypting, at the server, the second random number and the third random number based on the first key of the second private-public key pair and the first key of the third private-public key pair, respectively;
   sending, at the server, the encrypted second random number and the encrypted third random number to the first device and the second device, respectively; and
   receiving, at the server, the second random number and the third random number from the second device and the first device, respectively, for authenticating the first device and the second device for the transaction based on a comparison of the second random number received with the second random number originally generated by the server and a comparison of the third random number received with the third random number originally generated by the server.

2. The method according to claim 1, wherein:
   said receiving, at the first device, the transaction identifier, the first random number and the second random number from the server comprises receiving a message comprising the transaction identifier and the first random number, and a digital signature of the message generated based on a second key of the first private-public key pair, wherein the message is encrypted based on the first key of the second private-public key pair; and
   said verifying further comprises verifying, at the first device, the digital signature of the message received based on the first key of the first private-public key pair.

3. The method according to claim 2, further comprising:
   receiving, at the first device, a third random number associated with the second device from the second device via the communication channel; and
   sending, by the first device, the third random number to the server for authenticating the second device for the transaction based on the third random number.

4. The method according to claim 3, further comprising sending, by the first device, a digital signature of the third random number generated based on the second key of the second private-public key pair to the server for authenticating the second device for the transaction further based on the digital signature of the third random number.

5. The method according to claim 1, wherein the communication channel in which the first and second devices communicate data with each other is based on a two-way wireless communication channel.

6. The method according to claim 1, wherein:
said receiving, at the first device, the transaction identifier, the first random number and the second random number from the server comprises receiving a message comprising the transaction identifier, the first random number and the second random number, and a digital signature of the message generated based on a second key of the first private-public key pair, wherein the message is encrypted based on the first key of the second private-public key pair; and
said verifying further comprises verifying, at the first device, the digital signature of the message received based on the first key of the first private-public key pair.

7. The method according to claim 6, further comprising:
sending, by the second device, the transaction identifier and the second random number to the server for authenticating the first device for the transaction based on the comparison of second random number sent by the second device to the server with the second random number originally generated by the server.

8. The method according to claim 1, wherein the communication channel in which the first device communicates data to the second device is based on a one-way visual communication channel.

9. A system comprising:
a server;
a first device capable of communicating with the server; and
a second device capable of communicating with the server,
wherein:
the first device comprises:
  a memory; and
  at least one processor communicatively coupled to the memory and configured to:
    generate a first random number and encrypt the first random number based on a first key of a first private-public key pair;
    send the encrypted first random number to the server;
    receive a transaction identifier for a transaction between the first device and the second device, the first random number and a second random number from the server, wherein the transaction identifier, the first random number and the second random number are encrypted based on a first key of a second private-public key pair;
    decrypt the encrypted transaction identifier, the encrypted first random number and the encrypted second random number received based on a second key of the second private-public key pair;
    verify the first random number decrypted based on a comparison of the first random number decrypted with the first random number originally generated by the first device; and
    send the transaction identifier, and the second random number to the second device via a communication channel between the first and second devices for authenticating the first device for the transaction between the first device and the second device based on a comparison of the second random number received and sent by the second device to the server with the second random number originally generated by the server;
the second device comprises:
  a memory; and
  at least one processor communicatively coupled to the memory and configured to:
    receive a first identifier associated with the first device from the first device;
    send the transaction identifier and the first identifier to the server;
    receive the third random number associated with the second device from the server, wherein the third random number is encrypted based on a first key of a third private-public key pair; and
    send the second random number received from the first device to the server for authenticating the first device for the transaction based on the comparison of the second random number sent by the second device to the server with the second random number originally generated by the server, the second random number being associated with the first device; and
the server comprises:
  a memory; and
  at least one processor communicatively coupled to the memory and configured to:
    receive the transaction identifier and the first identifier from the second device;
    generate the second random number and the third random number associated with the second device;
    encrypt the second random number and the third random number based on the first key of the second private-public key pair and the first key of the third private-public key pair, respectively;
    send the encrypted second random number and the encrypted third random number to the first device and the second device, respectively; and
    receive the second random number and the third random number from the second device and the first device, respectively, for authenticating the first device and the second device for the transaction based on a comparison of the second random number received with the second random number originally generated by the server and a comparison of the third random number received with the third random number originally generated by the server.

10. The system according to claim 9, wherein:
said receive the transaction identifier, the first random number and the second random number from the server comprises receiving a message comprising the transaction identifier and the first random number, and a digital signature of the message generated based on a second key of the first private-public key pair, wherein the message is encrypted based on the first key of the second private-public key pair; and
said verify comprises verifying the digital signature of the message received based on the first key of the first private-public key pair.

11. The system according to claim 10, wherein the at least one processor of the first device is further configured to:
receive a third random number associated with the second device from the second device via the communication channel; and
send the third random number to the server for authenticating the second device for the transaction based on the third random number.

12. The system according to claim 11, wherein the at least one processor of the first device is further configured to send, by the first device, a digital signature of the third random number generated based on the second key of the second private-public key pair to the server for authenticating the second device for the transaction further based on the digital signature of the third random number.

13. The system according to claim 9, wherein the communication channel in which the first and second devices communicate with each other is based on a two-way wireless communication channel.

14. The system according to claim 9, wherein:
said receive the transaction identifier, the first random number and the second random number from the server comprises receiving a message comprising the transaction identifier, the first random number and the second random number, and a digital signature of the message generated based on a second key of the first private-public key pair, wherein the message is encrypted based on the first key of the second private-public key pair; and
said verify further comprises verifying the digital signature of the message received based on the first key of the first private-public key pair.

15. The system according to claim 14, wherein the
at least one processor of the second device is further configured to:
send the transaction identifier and the second random number to the server for authenticating the first device for the transaction based on the comparison of the second random number sent by the second device to the server with the second random number originally generated by the server.

16. The system according to claim 9, wherein the communication channel in which the first device communicates data to the second device is based on a one-way visual communication channel.

17. A computer program product, embodied in one or more non-transitory computer-readable storage mediums, comprising instructions executable by at least one processor to perform a method of performing authentication for a transaction between a first device and a second device, the method comprising:
generating, at the first device, a first random number and encrypting the first random number based on a first key of a first private-public key pair;
sending, by the first device, the encrypted first random number to a server;
receiving, at the first device, a transaction identifier for the transaction between the first device and the second device, the first random number and a second random number from the server, wherein the transaction identifier, the first random number and the second random number are encrypted based on a first key of a second private-public key pair;
decrypting, at the first device, the encrypted transaction identifier, the encrypted first random number and the encrypted second random number received based on a second key of the second private-public key pair;
verifying, at the first device, the first random number decrypted based on a comparison of the first random number decrypted with the first random number originally generated by the first device;
sending, by the first device, the transaction identifier and the second random number to the second device via a communication channel between the first and second devices for authenticating the first device for the transaction between the first device and the second device based on a comparison of the second random number received and sent by the second device to the server with the second random number originally generated by the server;
receiving, at the second device, a first identifier associated with the first device from the first device;
sending, by the second device, the transaction identifier and the first identifier to the server;
receiving, at the second device, the third random number associated with the second device from the server, wherein the third random number is encrypted based on a first key of a third private-public key pair;
sending, by the second device, the second random number received from the first device to the server for authenticating the first device for the transaction based on the comparison of the second random number sent by the second device to the server with the second random number originally generated by the server, the second random number being associated with the first device;
receiving, at the server, the transaction identifier and the first identifier from the second device;
generating, at the server, the second random number associated with the first device and the third random number associated with the second device;
encrypting, at the server, the second random number and the third random number based on the first key of the second private-public key pair and the first key of the third private-public key pair, respectively;
sending, at the server, the encrypted second random number and the encrypted third random number to the first device and the second device, respectively; and
receiving, at the server, the second random number and the third random number from the second device and the first device, respectively, for authenticating the first device and the second device for the transaction based on a comparison of the second random number received with the second random number originally generated by the server and a comparison of the third random number received with the third random number originally generated by the server.

* * * * *